US009465348B2

(12) United States Patent
Maekawa et al.

(10) Patent No.: US 9,465,348 B2
(45) Date of Patent: Oct. 11, 2016

(54) POWER SUPPLY DEVICE, IMAGE FORMING APPARATUS, AND VOLTAGE OUTPUT METHOD

(71) Applicants: Tomonori Maekawa, Kanagawa (JP); Masahide Nakaya, Kanagawa (JP); Tomokazu Takeuchi, Kanagawa (JP); Katsuhito Suzuki, Kanagawa (JP); Shohgo Miura, Kanagawa (JP)

(72) Inventors: Tomonori Maekawa, Kanagawa (JP); Masahide Nakaya, Kanagawa (JP); Tomokazu Takeuchi, Kanagawa (JP); Katsuhito Suzuki, Kanagawa (JP); Shohgo Miura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 268 days.

(21) Appl. No.: 14/209,005

(22) Filed: Mar. 13, 2014

(65) Prior Publication Data
US 2014/0265552 A1   Sep. 18, 2014

(30) Foreign Application Priority Data

Mar. 15, 2013 (JP) .................... 2013-054182
Jan. 16, 2014 (JP) .................... 2014-006077

(51) Int. Cl.
*G03G 15/16* (2006.01)
*G03G 15/00* (2006.01)
*H02J 5/00* (2016.01)

(52) U.S. Cl.
CPC .......... *G03G 15/80* (2013.01); *G03G 15/1675* (2013.01); *H02J 5/00* (2013.01); *G03G 2215/0129* (2013.01)

(58) Field of Classification Search
CPC ............ H02J 4/00; H02J 5/00; G03G 15/80; G03G 15/1675; G03G 2215/0129
See application file for complete search history.

(56) References Cited

U.S. PATENT DOCUMENTS

| 6,026,257 A * | 2/2000 | Takami .............. G03G 15/1675 399/66 |
| 8,315,534 B2 * | 11/2012 | Yano ...................... G03G 15/80 399/88 |
| 2008/0260401 A1 | 10/2008 | Shimazaki |
| 2010/0008685 A1 | 1/2010 | Shibuya |
| 2011/0229168 A1 | 9/2011 | Shiraishi et al. |
| 2012/0045231 A1 | 2/2012 | Ogino et al. |
| 2012/0045237 A1 | 2/2012 | Aoki et al. |
| 2012/0045259 A1 | 2/2012 | Nakamura et al. |
| 2012/0213536 A1 | 8/2012 | Takeuchi |
| 2012/0230715 A1 | 9/2012 | Ogino et al. |
| 2012/0237234 A1 | 9/2012 | Sugimoto et al. |
| 2012/0237271 A1 | 9/2012 | Sengoku et al. |
| 2012/0243892 A1 | 9/2012 | Nakamura et al. |

(Continued)

FOREIGN PATENT DOCUMENTS

| JP | 07-168403 | 7/1995 |
| JP | 2007-304492 | 11/2007 |

(Continued)

*Primary Examiner* — Matthew Nguyen
(74) *Attorney, Agent, or Firm* — Oblon, McClelland, Maier & Neustadt, L.L.P.

(57) ABSTRACT

According to an aspect of the present invention, a power supply device includes: a DC power supply that outputs a DC voltage; an AC power supply that outputs any one of the DC voltage and a superimposed voltage being the DC voltage with an AC voltage superimposed thereon; and a bypass capacitor that charges a part of a voltage that is output from the AC power supply. The DC power supply starts outputting the DC voltage in a constant voltage mode and, when a predetermined condition is satisfied, switches from the constant voltage mode to a constant current mode to output the DC voltage in the constant current mode.

9 Claims, 12 Drawing Sheets

(56) References Cited

U.S. PATENT DOCUMENTS

| | | |
|---|---|---|
| 2012/0308250 A1 | 12/2012 | Shimizu et al. |
| 2012/0315058 A1 | 12/2012 | Shimizu et al. |
| 2012/0321336 A1 | 12/2012 | Ogiyama |
| 2012/0328314 A1 | 12/2012 | Sugimoto et al. |
| 2012/0328315 A1 | 12/2012 | Takeuchi et al. |
| 2012/0328320 A1 | 12/2012 | Fujita et al. |
| 2012/0328321 A1 | 12/2012 | Takeuchi et al. |
| 2013/0004190 A1 | 1/2013 | Sengoku et al. |
| 2013/0011155 A1 | 1/2013 | Ogiyama et al. |
| 2013/0016989 A1 | 1/2013 | Fujita et al. |
| 2013/0064559 A1 | 3/2013 | Nakamura et al. |
| 2013/0078014 A1 | 3/2013 | Ogiyama |
| 2013/0089363 A1 | 4/2013 | Mimbu et al. |
| 2013/0094870 A1 | 4/2013 | Shimizu et al. |
| 2013/0121714 A1 | 5/2013 | Tanaka et al. |
| 2013/0136468 A1 | 5/2013 | Shimizu et al. |
| 2013/0136477 A1 | 5/2013 | Ogiyama et al. |
| 2013/0142531 A1 | 6/2013 | Sugimoto et al. |
| 2013/0148993 A1 | 6/2013 | Aoki et al. |
| 2013/0164011 A1 | 6/2013 | Nakamura et al. |
| 2013/0177329 A1 | 7/2013 | Tanaka et al. |
| 2013/0195483 A1 | 8/2013 | Shimizu et al. |
| 2013/0216281 A1 | 8/2013 | Suzuki et al. |
| 2013/0236201 A1 | 9/2013 | Mizutani et al. |
| 2013/0308968 A1 | 11/2013 | Tanaka et al. |
| 2014/0029988 A1 | 1/2014 | Shimizu et al. |
| 2014/0192574 A1* | 7/2014 | Nozaki ................ G03G 15/80 363/77 |
| 2014/0328603 A1* | 11/2014 | Mizutani ........... G03G 15/1605 399/21 |
| 2015/0030342 A1* | 1/2015 | Yoshioka ............... G03G 15/80 399/66 |

FOREIGN PATENT DOCUMENTS

| | | |
|---|---|---|
| JP | 2008-058585 | 3/2008 |
| JP | 2008-216388 | 9/2008 |
| JP | 2010-019936 | 1/2010 |
| JP | 2012-042835 | 3/2012 |

* cited by examiner

POWER SUPPLY DEVICE, IMAGE
FORMING APPARATUS, AND VOLTAGE
OUTPUT METHOD

CROSS-REFERENCE TO RELATED
APPLICATIONS

The present application claims priority to and incorporates by reference the entire contents of Japanese Patent Application No. 2013-054182 filed in Japan on Mar. 15, 2013 and Japanese Patent Application No. 2014-006077 filed in Japan on Jan. 16, 2014.

BACKGROUND OF THE INVENTION

1. Field of the Invention

The present invention relates generally to power supply devices, image forming apparatuses, and voltage output methods.

2. Description of the Related Art

An electrophotographic image forming apparatus typically forms an image on a recording medium (recording paper) by forming an electrostatic latent image on an image carrier that is uniformly charged, developing the electrostatic latent image with toner to form a toner image, and transferring and fixing the obtained toner image onto the recording paper.

Meanwhile, recording paper generally has a surface roughness. Toner is less easily transferred to depressions than to projections. Accordingly, when an image is to be formed on recording paper having a highly rough surface, toner can fail to be transferred to depressions, causing the image to disadvantageously have density inconsistencies such as white spots.

To overcome this disadvantage, for example, Japanese Laid-open Patent Application No. 2012-42835 discloses the following technique. That is, a DC power supply and an AC power supply are series-connected. A voltage applied to a transfer unit to transfer an image onto recording paper is switched using a relay between a DC voltage and a DC/AC superimposed voltage depending on a degree of surface roughness of the recording paper.

However, such a conventional technique as that described above is disadvantageous in that rise time of a DC voltage that is output from series-connected power supplies is longer than a DC voltage that is output from a single DC power supply.

Under the circumstances, there is a need for power supply devices, image forming apparatuses, and voltage output methods capable of reducing voltage rise time.

SUMMARY OF THE INVENTION

It is an object of the present invention to at least partially solve the problems in the conventional technology.

According to the present invention, there is provided a power supply device comprising: a direct-current (DC) power supply that outputs a DC voltage; an alternating-current (AC) power supply that outputs any one of the DC voltage and a superimposed voltage being the DC voltage with an AC voltage superimposed thereon; and a bypass capacitor that charges a part of a voltage that is output from the AC power supply, wherein the DC power supply starts outputting the DC voltage in a constant voltage mode and, when a predetermined condition is satisfied, switches from the constant voltage mode to a constant current mode to output the DC voltage in the constant current mode.

The present invention also provides an image forming apparatus including a power supply device, wherein the power supply device comprises; a direct-current (DC) power supply that outputs a DC voltage, an alternating-current (AC) power supply that outputs any one of a superimposed voltage and the DC voltage, the superimposed voltage being the DC voltage with an AC voltage superimposed thereon, and a bypass capacitor that charges a part of a voltage that is output from the AC power supply, wherein the DC power supply starts outputting the DC voltage in a constant voltage mode and, when a predetermined condition is satisfied, switches from the constant voltage mode to a constant current mode to output the DC voltage in the constant current mode.

The present invention also provides a voltage output method comprising: a first output step that outputs a direct current (DC) voltage in a constant voltage mode, and when a predetermined condition is satisfied, switches from the constant voltage mode to a constant current mode to output the DC voltage in the constant current mode; and a second output step that outputs any one of the DC voltage and a superimposed voltage being the DC voltage with an alternative-current voltage superimposed thereon.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Although the embodiments are described by way of examples, in each of which an image forming apparatus according to an aspect of the present invention is embodied as an electrophotographic multiple-color image forming apparatus or, more specifically, a printing apparatus that forms an image by overlaying images of four color components: yellow (Y), magenta (M), cyan (C), and black (K), on a sheet of recording medium (hereinafter, "recording sheet"), embodiments are not limited thereto. The image forming apparatus according to an aspect of the present invention is applicable to any apparatus that forms an image by electrophotography irrespective of whether the image is a monochrome image or a multiple-color image. For example, the image forming apparatus is applicable to electrophotographic copiers and multifunction peripherals (MFPs). Meanwhile, an MFP is an apparatus that has at least two functions of a printing function, a copying function, a scanner function, and a facsimile function.

Configurations of a printing apparatus according to an embodiment of the present invention are described below.

Figure 1:
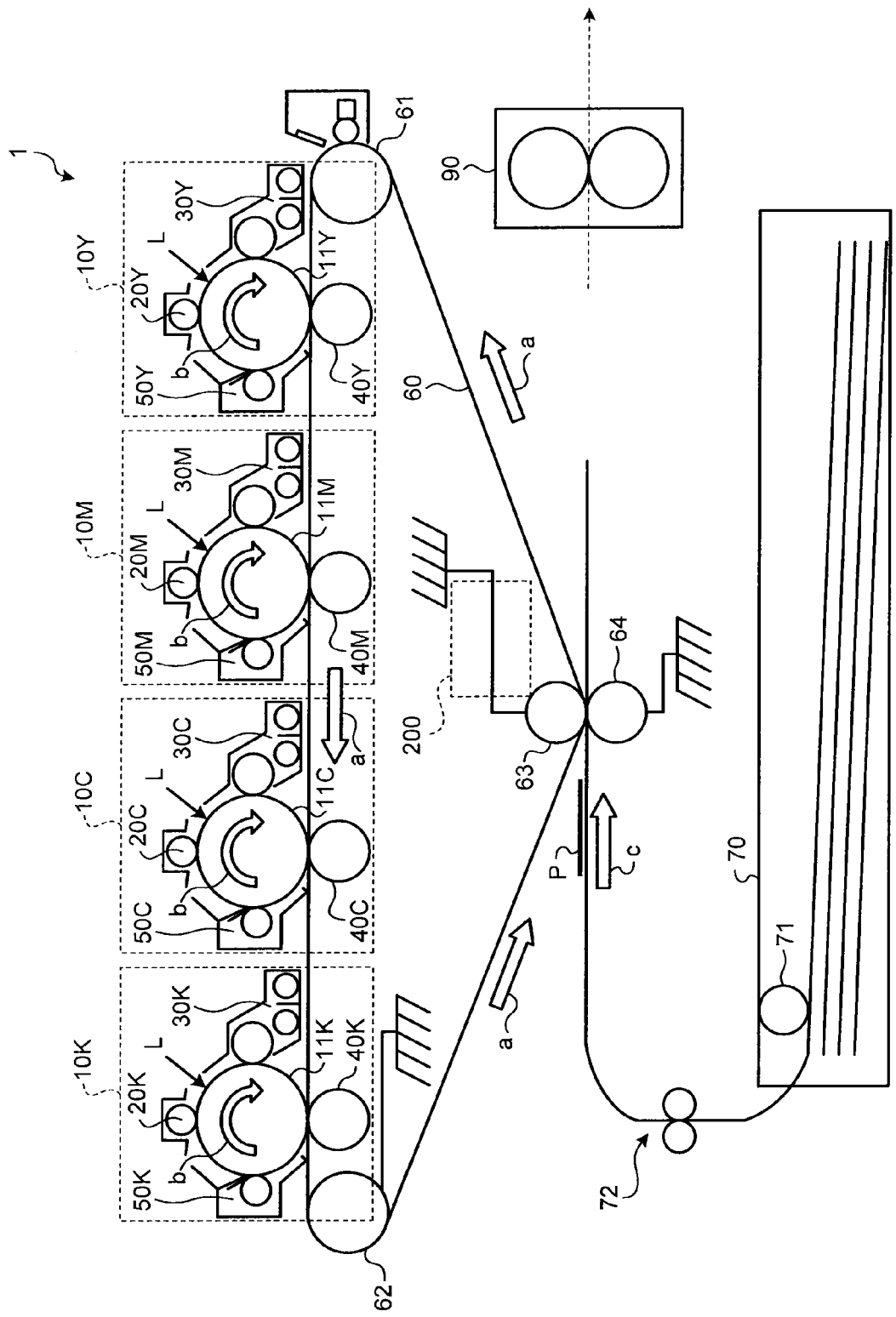
FIG. 1 is a diagram illustrating an example of a mechanical structure of a printing apparatus according to an embodiment of the present invention.

FIG. 1 is a diagram illustrating an example of a mechanical structure of a printing apparatus 1 according to this embodiment. As illustrated in FIG. 1, the printing apparatus 1 includes image forming units 10Y, 10M, 10C, and 10K, an intermediate transfer belt 60, support rollers 61 and 62, a secondary-transfer-part opposite roller (counter roller) 63, a secondary transfer roller 64, a sheet cassette 70, a sheet feeding roller 71, a pair of conveying rollers 72, a fixing device 90, and a secondary-transfer power supply 200.

As illustrated in FIG. 1, the image forming units 10Y, 10M, 10C, and 10K are arranged in this order along the intermediate transfer belt 60 from upstream in a moving direction (which is the direction indicated by arrow "a") of the intermediate transfer belt 60.

Figure 2:
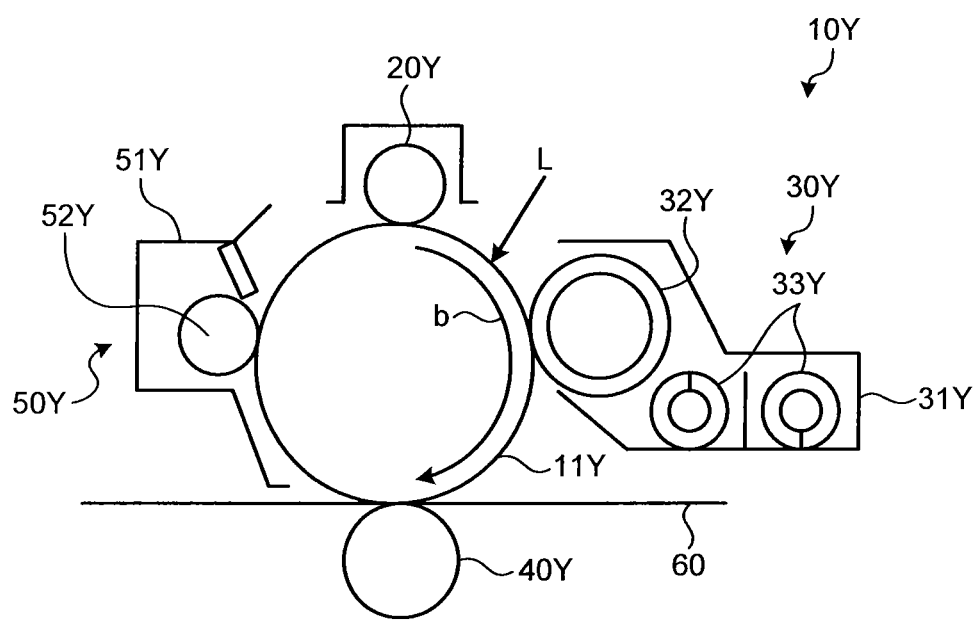
FIG. 2 is a diagram illustrating an example of a mechanical structure of an image forming unit of the embodiment.

FIG. 2 is a diagram illustrating an example of a mechanical structure of the image forming unit 10Y of this embodiment. As illustrated in FIG. 2, the image forming unit 10Y includes a photosensitive element 11Y, an electrostatic charging device 20Y, a developing device 30Y, a primary transfer roller 40Y, and a cleaning device 50Y. The image forming unit 10Y and an illuminating device (not shown) perform an image forming process (including a charging step, an illuminating step, a developing step, a transfer step, and a cleaning step) on the photosensitive element 11Y to thereby form a yellow toner image (an image of a color component) on the photosensitive element 11Y and transfer the yellow toner image onto the intermediate transfer belt 60.

Each of the image forming units 10M, 10C, and 10K includes identical constituent elements as those of the image forming unit 10Y. The image forming unit 10M forms a magenta toner image by performing the image forming process. The image forming unit 10C forms a cyan toner image by performing the image forming process. The image forming unit 10K forms a black toner image by performing the image forming process. Hereinafter, the constituent elements of the image forming unit 10Y are mainly described. Each constituent element of the image forming units 10M, 10C, and 10K identical to that of the image forming unit 10Y is denoted by a like reference numeral with its reference symbol Y replaced with a corresponding one of M, C, and K (see FIG. 1), and repeated description is omitted.

The photosensitive element 11Y is an image carrier and driven to rotate by a photosensitive-element driving device (not shown) in a direction indicated by arrowed line "b". The photosensitive element 11Y is, for instance, an organic photoconductor that is 60 mm in outer diameter. Each of the photosensitive elements 11M, 11C, and 11K is similarly driven to rotate by a photosensitive-element driving device (not shown) in the direction indicated by arrow "b".

The photosensitive element 11K for black may be configured to be driven to rotate independently of the photosensitive elements 11Y, 11M, and 11C for the other colors. This configuration allows driving only the photosensitive element 11K for black to rotate when a monochrome image is to be formed, while driving the photosensitive elements 11Y, 11M, 11C, and 11K to rotate simultaneously when a full-color image is to be formed.

First, in the charging step, the electrostatic charging device 20Y uniformly electrostatically charges a surface of the photosensitive element 11Y that is rotated. More specifically, the electrostatic charging device 20Y applies a superimposed voltage, which is a DC voltage with an AC voltage superimposed thereon, to a charging roller (not shown). The charging roller is a roller-shaped conductive elastic member, for example. The electrostatic charging device 20Y thus causes electrical discharge to occur directly between the charging roller and the photosensitive element 11Y, thereby causing the photosensitive element 11Y to bear charges of a predetermined polarity, e.g., negative charges.

Subsequently, in the illuminating step, the illuminating device (not shown) emits optically-modulated laser light L onto the charged surface of the photosensitive element 11Y to form an electrostatic latent image on the surface of the photosensitive element 11Y. As a result, a portion on the surface of the photosensitive element 11Y having a lower absolute value of the potential because of being irradiated with the laser light L forms an electrostatic latent image (image area); the other portion having an absolute value of the potential that is kept high because of not being irradiated with the laser light L forms a background portion (no-image area).

Subsequently, in the developing step, the developing device 30Y develops the electrostatic latent image formed on the photosensitive element 11Y with yellow toner, thereby forming a yellow toner image on the photosensitive element 11Y.

The developing device 30Y includes a container 31Y, a developing sleeve 32Y housed in the container 31Y, and screw members 33Y housed in the container 31Y. The container 31Y contains a two-component developer of yellow toner and carrier. The developing sleeve 32Y is a developer carrier and arranged to face the photosensitive element 11Y through an opening of the container 31Y. The screw members 33Y are stirring members that convey the developer while stirring the same. The screw members 33Y are arranged in the container 31Y on a side from which the developer is to be supplied, in other words, on a developing-sleeve side, and on a side to receive supply from a toner replenishing device (not shown) or, in other words, on a supply-receiving side. The screw members 33Y are rotatably supported on the container 31Y via bearings (not shown).

Subsequently, in the transfer step, the primary transfer roller 40Y transfers the yellow toner image formed on the photosensitive element 11Y to the intermediate transfer belt 60. Meanwhile, a slight amount of not-transferred toner remains on the photosensitive element 11Y even after the toner image has been transferred.

The primary transfer roller 40Y is, for instance, an elastic roller including a conductive foam layer, and arranged so that the primary transfer roller 40Y presses a back surface of the intermediate transfer belt 60 into contact with and against the photosensitive element 11Y. A bias generated in a constant current mode is applied to the elastic roller as a primary transfer bias. The primary transfer roller 40Y is, for example, 16 mm in outer diameter and made up of a metal core that is 10 mm in diameter and the foam layer having a resistance R of approximately $3 \times 10^7 \Omega$. The resistance R of the foam layer is calculated using the Ohm's law equation (R=V/I), where I is an electric current that flows through the foam layer when V, a voltage of 1,000 V, is applied to the metal core, which is grounded, 30 mm in outer diameter, and pressed against the foam layer with 10 N, of the primary transfer roller 40Y.

Subsequently, in the cleaning step, the cleaning device 50Y wipes off the not-transferred toner remaining on the photosensitive element 11Y. The cleaning device 50Y includes a cleaning blade 51Y and a cleaning brush 52Y. The cleaning blade 51Y cleans the surface of the photosensitive element 11Y by contacting the photosensitive element 11Y in a manner to oppose the rotating direction of the photosensitive element 11Y. The cleaning brush 52Y cleans the surface of the photosensitive element 11Y by rotating in a direction opposite to the rotating direction of the photosensitive element 11Y while contacting the photosensitive element 11Y.

Referring back to FIG. 1, the intermediate transfer belt 60 is an endless belt placed over and between a plurality of rollers including the support rollers 61 and 62 and the secondary-transfer-part opposite roller 63 in a stretched manner. The intermediate transfer belt 60 is revolved in the direction indicated by arrow "a" by the support roller 61 or 62 that is driven to rotate. Toner images are transferred onto the intermediate transfer belt 60 one by one to be overlaid on one another in a manner that: the image forming unit 10Y transfers a yellow toner image first; subsequently, the image forming unit 10M transfers a magenta toner image thereon; the image forming unit 10C transfers a cyan toner image thereon; and the image forming unit 10K transfers a black toner image thereon. As a result, full-color toner images (a full-color image) are formed on the intermediate transfer belt 60. The intermediate transfer belt 60 conveys the formed full-color toner images to a nip between the secondary-transfer-part opposite roller 63 and the secondary transfer roller 64. The intermediate transfer belt 60 is an endless belt made of polyimide in which carbon black is dispersed and is 20 to 200 µm in thickness (preferably approximately 60 µm), $10^{6.0}$ to $10^{13.0}$ $\Omega$cm in volume resistivity (preferably $10^{7.5}$ to $10^{12.5}$ $\Omega$cm, more preferably approximately $10^9$ $\Omega$cm), $10^{9.0}$ to $10^{13.0}$ $\Omega$cm in surface resistivity (preferably $10^{10.0}$ to $10^{12.0}$ $\Omega$cm). The volume resistivity is a value measured with a resistivity meter HIRESTA using an HRS probe both manufactured by MITSUBISHI CHEMICAL ANALYTEC CO., LTD at 100 V for 10 sec. The surface resistivity is a value measured with HIRESTA using an HRS probe both manufactured by MITSUBISHI CHEMICAL ANALYTEC CO., LTD at 500 V for 10 sec. The support roller 62 is grounded.

A plurality of sheets of recording paper is contained in a stacked manner in each of trays (not shown) of the sheet cassette 70. Paper type and size of the recording paper may vary from tray to tray where the recording paper is contained. In this embodiment, the recording paper is ordinary paper or leather-textured paper having high surface roughness for example; however, the recording paper is not limited thereto.

The sheet feeding roller 71 is in contact with an uppermost sheet (hereinafter, "recording sheet P") of the recording paper in one of the trays of the sheet cassette 70, and feeds the recording sheet P with which the sheet feeding roller 71 is in contact.

The pair of conveying rollers 72 conveys the recording sheet P fed by the sheet feeding roller 71 to the secondary transfer nip between the secondary-transfer-part opposite roller 63 and the secondary transfer roller 64 (in the direction indicated by arrow "c") at predetermined timing.

The secondary-transfer-part opposite roller 63 and the secondary transfer roller 64 that form the secondary transfer nip (not shown) therebetween transfer the full-color toner images conveyed on the intermediate transfer belt 60 together at one time onto the recording sheet P conveyed by the pair of conveying rollers 72.

The secondary-transfer-part opposite roller 63 is, for example, 24 mm in outer diameter and made up of a metal core that is 16 mm in diameter and a conductive modified-nitrile-butadiene rubber (NBR) layer. The resistance R of the conductive modified-NBR layer is $10^{6.0}\Omega$ to $10^{12.0}\Omega$, preferably $104.0\Omega$. The secondary transfer roller 64 is, for example, 24 mm in outer diameter and made up of a metal core that is 14 mm in diameter and a conductive modified-NBR layer. The resistance R of the conductive modified-NBR layer is $10^{6.0}\Omega$ to $10^{8.0}\Omega$, preferably $10^{7.0}\Omega$ to $10^{8.0}\Omega$. The volume resistivity of the secondary transfer roller 64 is obtained as an average of resistivity values measured during one minute in which a rotation measurement method is performed with the following conditions:

weight applied to one side: 5 N;
bias applied to a transfer roller shaft: 1 kV; and
rotation speed of the roller: 1 revolution/minute.

The secondary-transfer power supply 200 for a transfer bias is connected to the secondary-transfer-part opposite roller 63. The secondary-transfer power supply 200 (an example of a power supply device) applies a voltage to the secondary-transfer-part opposite roller 63 so that the full-color toner images are transferred to the recording sheet P at the secondary transfer nip. More specifically, the secondary-transfer power supply 200 applies a DC voltage (hereinafter, sometimes referred to as "DC bias") alone or a superimposed voltage (hereinafter, sometimes referred to as "superimposed bias"), which is the DC voltage on which an AC voltage is superimposed, to the secondary-transfer-part opposite roller 63 according to user's setting. This bias develops a potential difference between the secondary-transfer-part opposite roller 63 and the secondary transfer roller 64 and generates a voltage that urges toner from the intermediate transfer belt 60 toward the recording sheet P. The full-color toner images can be transferred to the recording sheet P. The potential difference in this embodiment is assumed as: (the potential of the secondary-transfer-part opposite roller 63)–(the potential of the secondary transfer roller 64).

The fixing device 90 applies heat and pressure onto the recording sheet P onto which the full-color toner images have been transferred, thereby fixing the full-color images onto the recording sheet P. The recording sheet P, onto which the full-color toner images have been fixed, is delivered to the exterior of the printing apparatus 1.

Figure 3:
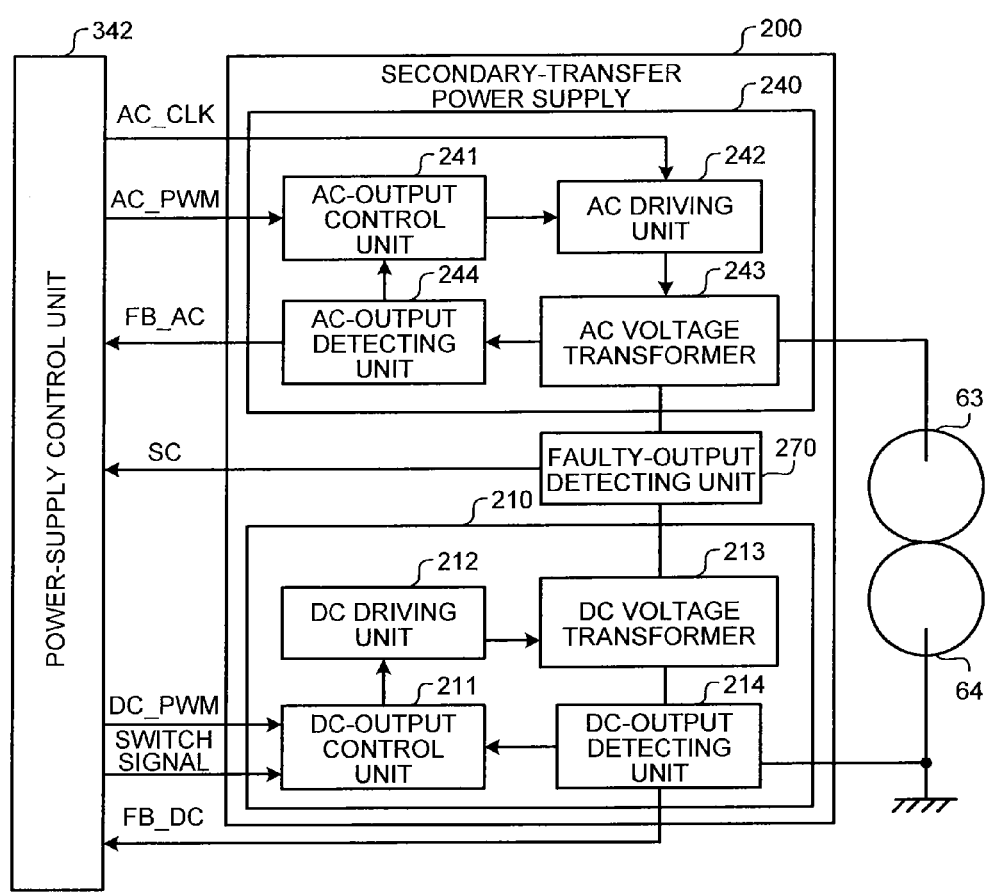
FIG. 3 is a block diagram illustrating an example configuration of a secondary-transfer power supply of the embodiment.

FIG. 3 is a block diagram illustrating an example configuration of the secondary-transfer power supply 200 of this embodiment. As illustrated in FIG. 3, the printing apparatus 1 includes a power-supply control unit 342 and the secondary-transfer power supply 200. The secondary-transfer power supply 200 includes a DC power supply 210, an AC power supply 240, and a faulty-output detecting unit 270. The DC power supply 210, which is a power supply for transferring toner, includes a DC-output control unit 211, a DC driving unit 212, a DC voltage transformer 213, and a DC-output detecting unit 214. The AC power supply 240, which is a power supply for causing toner to oscillate, includes an AC-output control unit 241, an AC driving unit 242, an AC voltage transformer 243, and an AC-output detecting unit 244. The power-supply control unit 342 that controls the secondary-transfer power supply 200 can be implemented in a central processing unit (CPU), for example.

The DC-output control unit 211 receives, from the power-supply control unit 342, a DC_PWM (power width modulation) signal (DC-bias output signal) that specifies an output level (output value) of the DC voltage. The DC-output control unit 211 receives, from the DC-output detecting unit 214, an output value of the DC voltage transformer 213 detected by the DC-output detecting unit 214. The DC-output control unit 211 controls the DC voltage transformer 213 via the DC driving unit 212 so that the output value of the DC voltage transformer 213 achieves the output value specified by the DC_PWM signal based on a duty ratio of the DC_PWM signal and the output value of the DC voltage transformer 213 that are fed to the DC-output control unit 211.

The DC-output control unit 211 also receives, from the power-supply control unit 342, a switch signal that instructs switching between the constant current mode and a constant voltage mode. The DC-output control unit 211 switches between the constant current mode and the constant voltage mode according to the switch signal fed to the DC-output control unit 211. In this embodiment, the DC power supply 210 mainly operates in the constant current mode to maintain a toner transfer ratio constant; however, the DC power supply 210 operates in the constant voltage mode under some situations to reduce rise time of the DC voltage.

The DC driving unit 212 drives the DC voltage transformer 213 under control of the DC-output control unit 211.

The DC voltage transformer 213 driven by the DC driving unit 212 outputs a DC high voltage (DC bias) that is negative in polarity.

The DC-output detecting unit 214 detects the output value of the DC high voltage output from the DC voltage transformer 213 and outputs the detected output value to the DC-output control unit 211. The DC-output detecting unit 214 also outputs the detected output value to the power-supply control unit 342 as an FB_DC signal (feedback signal). This is because the FB_DC signal is used by the power-supply control unit 342 in controlling the duty ratio of the DC_PWM signal so as to prevent degradation of transfer performance due to environmental conditions or load.

The AC-output control unit 241 receives, from the power-supply control unit 342, an AC_PWM signal (AC-bias output signal) that specifies an output level (output value) of the AC voltage. The AC-output control unit 241 receives, from the AC-output detecting unit 244, an output value of the AC voltage transformer 243 detected by the AC-output detecting unit 244. The AC-output control unit 241 controls the AC voltage transformer 243 via the AC driving unit 242 so that the output value of the AC voltage transformer 243 achieves the output value specified by the AC_PWM signal based on a duty ratio of the AC_PWM signal and the output value of the AC voltage transformer 243 that are fed to the AC-output control unit 241.

The AC driving unit 242 receives an AC_CLK signal that specifies a frequency of the AC output voltage. The AC driving unit 242 drives the AC voltage transformer 243 under control of the AC-output control unit 241 and based on the AC_CLK signal. The AC driving unit 242 can control an output waveform generated by the AC voltage transformer 243 so as to have a frequency specified by the AC_CLK signal by controlling the AC voltage transformer 243 based on the AC_CLK signal.

The AC voltage transformer 243 is driven by the AC driving unit 242 to generate an AC voltage. The AC voltage transformer 243 then produces a superimposed voltage by superimposing the generated AC voltage on the DC high voltage output from the DC voltage transformer 213, and outputs (applies) the produced superimposed voltage (superimposed bias) to the secondary-transfer-part opposite roller 63. When no AC voltage is to be generated, the AC voltage transformer 243 outputs (applies) the DC high voltage (DC bias) output from the DC voltage transformer 213 to the secondary-transfer-part opposite roller 63. The voltage (the superimposed voltage or the DC voltage) applied to the secondary-transfer-part opposite roller 63 returns to the DC power supply 210 via the secondary transfer roller 64.

The AC-output detecting unit 244 detects the output value of the AC voltage output from the AC voltage transformer 243 and outputs the detected output value to the AC-output control unit 241. The AC-output detecting unit 244 also outputs the detected output value to the power-supply control unit 342 as an FB_AC signal (feedback signal). This is because the FB_AC signal is used by the power-supply control unit 342 in controlling the duty ratio of the AC_PWM signal so as to prevent degradation of transfer performance due to environmental conditions or load.

In this embodiment, the AC power supply 240 operates in a constant voltage mode. However, the mode in which the AC power supply 240 is to operate is not limited thereto, and the AC power supply 240 may alternatively operate in a constant current mode.

The waveform of the AC voltage generated by the AC voltage transformer 243 (the AC power supply 240) may be either sinusoidal or rectangular. In this embodiment, it is assumed that the AC voltage has a short wavelength and a rectangular waveform. This is because the AC voltage having a short wavelength and a rectangular waveform can contribute to further enhancement of image quality.

The faulty-output detecting unit 270, which is arranged on an output line from the secondary-transfer power supply 200, outputs an SC signal to the power-supply control unit 342 at occurrence of an output fault, such as a line-to-ground fault. The power-supply control unit 342 can control the secondary-transfer power supply 200 to stop outputting a high output voltage based on this SC signal.

Figure 4:
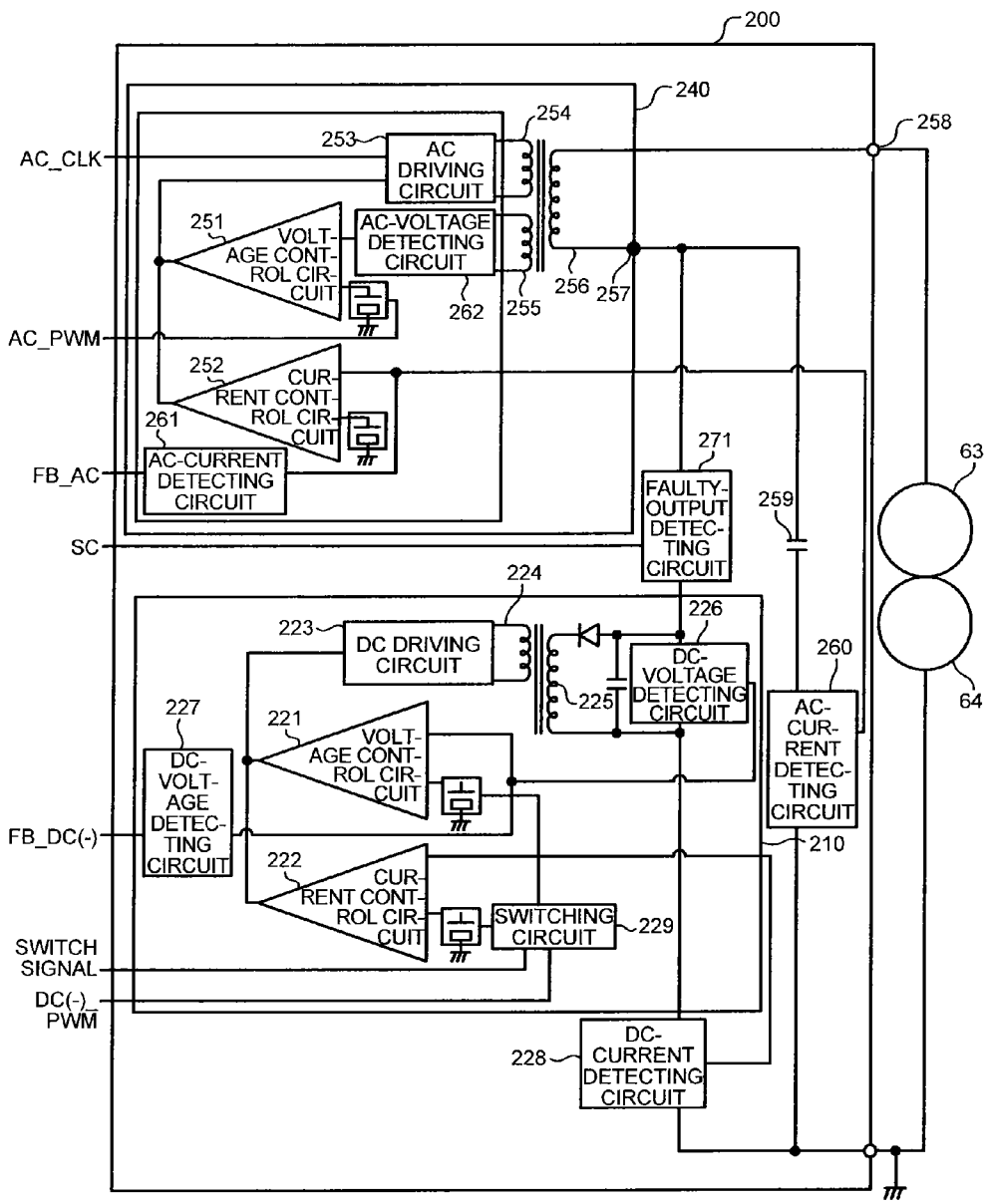
FIG. 4 is a circuit diagram illustrating an example configuration of the secondary-transfer power supply of the embodiment.

FIG. 4 is a circuit diagram illustrating an example configuration of the secondary-transfer power supply 200 of this embodiment.

The DC power supply 210 receives, at a switching circuit 229, the DC(−)_PWM signal and the switch signal from the power-supply control unit 342. When the switch signal instructs to switch to the constant voltage (CV) mode (in this embodiment, when the switch signal is at high state), the DC(−)_PWM signal is output to a current control circuit 222 (comparator). When the switch signal instructs to switch to the constant current (CC) mode (in this embodiment, when the switch signal is at low state), the DC(−)_PWM signal is output to a voltage control circuit 221 (comparator).

The integral of the DC(−)_PWM signal output to the current control circuit 222 is calculated, and input to the current control circuit 222 (comparator). The value of the integral of the DC(−)_PWM signal is used as a reference voltage in the current control circuit 222. A DC-current detecting circuit 228 detects a DC current output from the DC power supply 210 on the output line from the secondary-transfer power supply 200, and inputs the detected output value of the DC current to the current control circuit 222. When the detected DC current is small relative to the reference voltage, the current control circuit 222 causes a DC driving circuit 223 to actively drive the DC high-voltage transformer; when the detected DC current is large relative to the reference voltage, the current control circuit 222 causes the DC driving circuit 223 to restrict driving of the DC high-voltage transformer. The DC power supply 210 maintains the DC voltage at a constant current in this way.

The integral of the DC(−)_PWM signal fed to the voltage control circuit 221 is calculated, and input to the voltage control circuit 221. The value of the integral of the DC(−)_PWM signal is used as a reference voltage in the voltage control circuit 221. A DC-voltage detecting circuit 226 detects the DC voltage output from the DC power supply 210 and inputs the detected output value of the DC voltage to the voltage control circuit 221 (comparator). When the detected output value of the DC voltage is small relative to the reference voltage, the voltage control circuit 221 causes the DC driving circuit 223 to actively drive the DC high-voltage transformer; when the detected output value of the DC voltage is equal to or larger than the reference voltage (upper limit), the voltage control circuit 221 causes the DC driving circuit 223 to restrict driving of the DC high-voltage transformer. The DC power supply 210 maintains the DC voltage at a constant voltage in this way. A DC-voltage detecting circuit 227 feeds back the output value of the DC voltage detected by the DC-voltage detecting circuit 226 to the power-supply control unit 342 as the FB_DC(−) signal.

The output voltage generated by the DC high-voltage transformer, which includes a primary winding N1_DC(−) 224 and a secondary winding N2_DC(−) 225 and is driven by the DC driving circuit 223 in accordance with the control of the current control circuit 222 and the voltage control circuit 221, is smoothed by a diode and a capacitor. Thereafter, the smoothed output voltage is input to the AC power supply 240 via an AC-power-supply input node 257 as a DC voltage and applied to a secondary winding N2_AC 256 of the AC high-voltage transformer.

The AC power supply 240 receives the AC_PWM signal from the power-supply control unit 342. The AC_PWM signal is input to a voltage control circuit 251 (comparator). The value of the input AC_PWM signal serves as a reference voltage in the voltage control circuit 251. An AC-voltage detecting circuit 262 predicts an output value of the AC voltage from a voltage induced by mutual induction in a primary winding N3_AC 255 of the AC high-voltage transformer, and inputs the predicted output value of the AC voltage to the voltage control circuit 251. The reason for making this prediction is that because this AC voltage is superimposed on the DC voltage, it is difficult to detect the output (AC voltage) of the AC power supply 240 in isolation on the output line from the secondary-transfer power supply 200. When the detected AC voltage is small relative to the reference voltage, the current control circuit 251 causes an AC driving circuit 253 to actively drive the AC high-voltage transformer; when the detected AC voltage is large relative to the reference voltage, the voltage control circuit 251 causes the AC driving circuit 253 to restrict driving of the AC high-voltage transformer. The AC power supply 240 maintains the AC voltage at a constant voltage in this way.

An AC-current detecting circuit 260 detects an AC current on a low voltage side of an AC bypass capacitor 259, which is on the output line from the secondary-transfer power supply 200, and inputs the detected output value of the AC current to a current control circuit 252 (comparator). The current control circuit 252 causes the AC driving circuit 253 to restrict driving of the AC high-voltage transformer when the detected output value of the AC current is equal to or larger than the upper limit. An AC-current detecting circuit 261 feeds back the detected output value of the AC current to the power-supply control unit 342 as the FB_AC signal.

The AC driving circuit 253 operates in accordance with the AC_CLK signal fed from the power-supply control unit 342 and a logical AND of the voltage control circuit 251 and the current control circuit 252 and causes the AC high-voltage transformer to generate an output voltage having a same period as the AC_CLK signal.

An AC voltage induced in a primary winding N1_AC 254 of the AC high-voltage transformer driven by the AC driving circuit 253 is superimposed on the DC voltage that is applied to the secondary winding N2_AC 256 and output (applied) to the secondary-transfer-part opposite roller 63 as the superimposed voltage via a high-voltage output node 258. However, when the AC power supply 240 is not driven, the DC voltage applied to the secondary winding N2_AC 256 is output (applied) as it is to the secondary-transfer-part opposite roller 63 via the high-voltage output node 258.

A faulty-output detecting circuit 271 outputs the SC signal to the power-supply control unit 342 upon detecting an output fault, such as a line-to-ground fault, on the output line from the secondary-transfer power supply 200.

Characteristics of the AC bypass capacitor 259 of the secondary-transfer power supply 200 are described below.

The purpose of the AC bypass capacitor 259 is to charges a part of the AC voltage output from the AC power supply 240 in order to prevent the output AC voltage from sneaking into the DC power supply 210. The output DC voltage has high impedance, and can be superimposed to the AC power supply 240 with low loss.

However, at startup of the DC power supply 210, because charge is not stored in the AC bypass capacitor 259, the AC bypass capacitor 259 has considerably low impedance. Accordingly, charge output as the DC voltage from the DC power supply 210 undesirably flows into the AC bypass capacitor 259. For this reason, the DC power supply 210 cannot supply sufficient electric power to the secondary-transfer-part opposite roller 63 until charge is stored in the AC bypass capacitor 259. This results in delay in rise time.

To overcome this disadvantage, in this embodiment, during rising of the DC voltage, the DC power supply 210 operates in the constant voltage mode to store charge in the AC bypass capacitor 259 quickly, thereby reducing rise time of the DC voltage. This embodiment thus allows reducing start-up time after power-on and intervals between sheets in printing, thereby achieving power saving and increasing print productivity.

Figure 5:
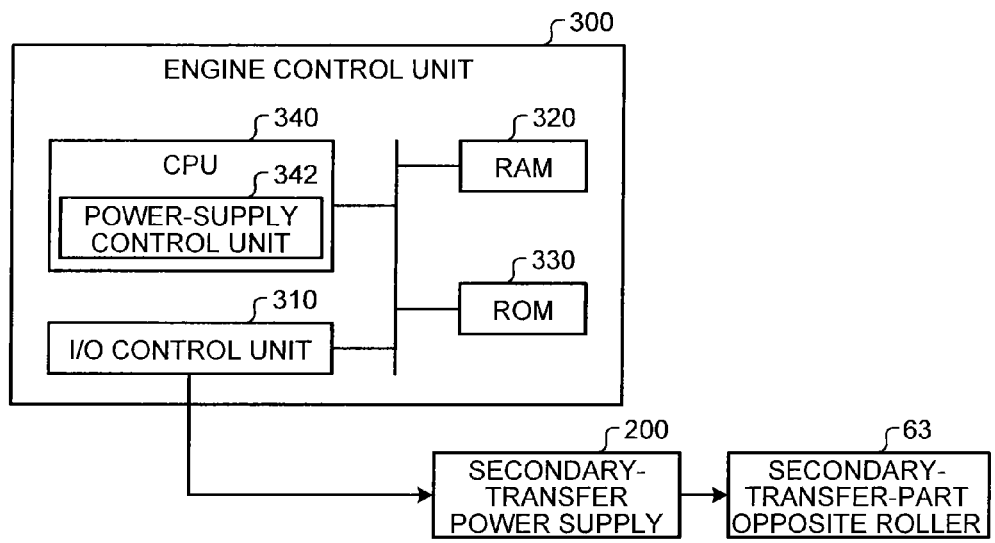
FIG. 5 is a block diagram illustrating an example configuration of an engine control unit included in the printing apparatus of the embodiment.

FIG. 5 is a block diagram illustrating an example configuration of an engine control unit 300 included in the printing apparatus 1 of this embodiment. Referring to FIG. 5, the printing apparatus 1 includes the engine control unit 300, the secondary-transfer power supply 200, and the secondary-transfer-part opposite roller 63.

The engine control unit 300 performs engine control, e.g., control related to image forming, and includes an I/O control unit 310, a random access memory (RAM) 320, a read only memory (ROM) 330, and a CPU 340.

The I/O control unit 310 controls inputs and outputs of various types of signals. For example, the I/O control unit 310 controls inputs and outputs of signals exchanged between the engine control unit 300 and the secondary-transfer power supply 200.

The RAM 320 is a volatile storage device (memory) and used as a working area by the CPU 340 and the like.

The ROM 330 (an example of a storage unit) is a non-volatile read-only storage device (memory). The ROM 330 stores various types of computer programs to be executed in the printing apparatus 1 and data for use in various types of processing executed in the printing apparatus 1. The ROM 330 may be implemented in a flash memory or the like so that data can be written to the ROM 330. The ROM 330 stores, for example, specifying information that specifies switch-to-constant-voltage timing, at which the DC power supply 210 is to switch to the constant voltage mode, and switch-to-constant-current timing (an example of predetermined timing), at which the DC power supply 210 is to switch to the constant current mode. The specifying information specifies the switch-to-constant-voltage timing and the switch-to-constant-current timing with reference to a print-start reference signal indicating a print start reference.

Operations to be performed by the CPU 340 include accepting an input of the print-start reference signal and accepting settings entered by a user from an operating unit (not shown) such as an operation panel. For instance, when a recording sheet to be printed is ordinary paper, a user may input "applying a high voltage with only the dc bias" from the operating unit as the user's setting about high voltage application. When the recording sheet is leather-textured paper having a high surface roughness, the user may input "applying a high voltage with the superimposed bias" as the user's setting about high voltage application. The CPU 340 causes the secondary-transfer power supply 200 to apply the high voltage via the I/O control unit 310 in accordance with the user's setting. The CPU 340 includes the power-supply control unit 342.

When causing the secondary-transfer power supply 200 to output the high voltage (the DC voltage or the superimposed voltage), the power-supply control unit 342 controls the DC voltage output from the DC power supply 210 based on the specifying information stored in the ROM 330. More specifically, the power-supply control unit 342 causes the DC power supply 210 to switch to the constant voltage mode or to the constant current mode based on the specifying information.

Hereinafter, difference between a situation, in which the DC power supply 210 outputs a DC voltage by operating only in the constant current mode, and a situation, in which the DC power supply 210 outputs a DC voltage while switching between the constant voltage mode and the constant current mode, is described below with reference to FIGS. 6 and 7.

Figure 6:
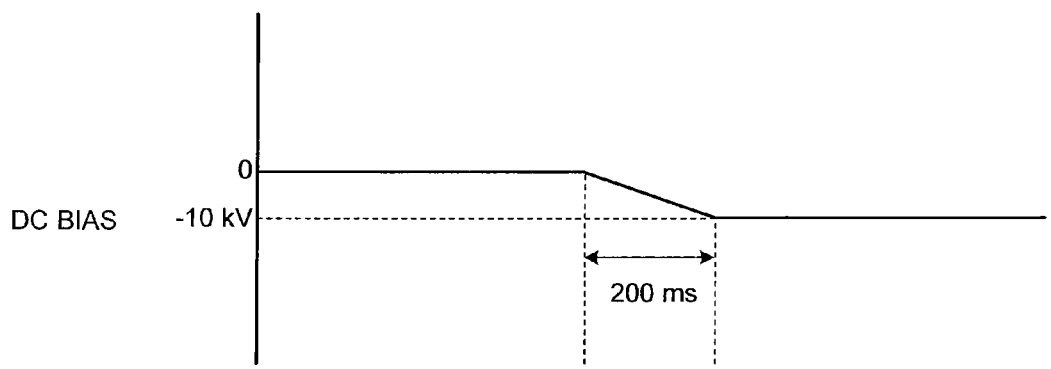
FIG. 6 is a diagram illustrating a comparative example for comparison with the embodiment.

FIG. 6 is a diagram illustrating, as a comparative example for this embodiment, an example of rise timing of a DC bias output from the DC power supply 210 operating only in the constant current mode. FIG. 7 is a diagram illustrating, as an example of switching control of this embodiment, an example of rise timing of a DC bias output from the DC power supply 210 that switches to the constant voltage mode and then to the constant current mode.

Meanwhile, "rise" denotes transition from a state (0 kV) where there is no potential difference to a state where there is a potential difference irrespective of whether the potential difference is positive or negative. For reference, "fall" denotes transition from a state where there is a potential difference irrespective of whether the potential difference is positive or negative to the state (0 kV) where there is no potential difference.

In the example illustrated in FIG. 6, 200 ms is required from when the DC power supply 210 starts outputting the DC bias until when a value of the bias achieves a target value (−10 kV).

This is because, as described earlier, charge output as the DC bias from the DC power supply 210 undesirably flows into the AC bypass capacitor 259 until charge is stored in the AC bypass capacitor 259. In particular, in the constant current mode, the value of the constant current imposes an upper limit on an amount of charge output as the DC bias; therefore, it takes longer time until charge is stored in the AC bypass capacitor 259.

Figure 7:
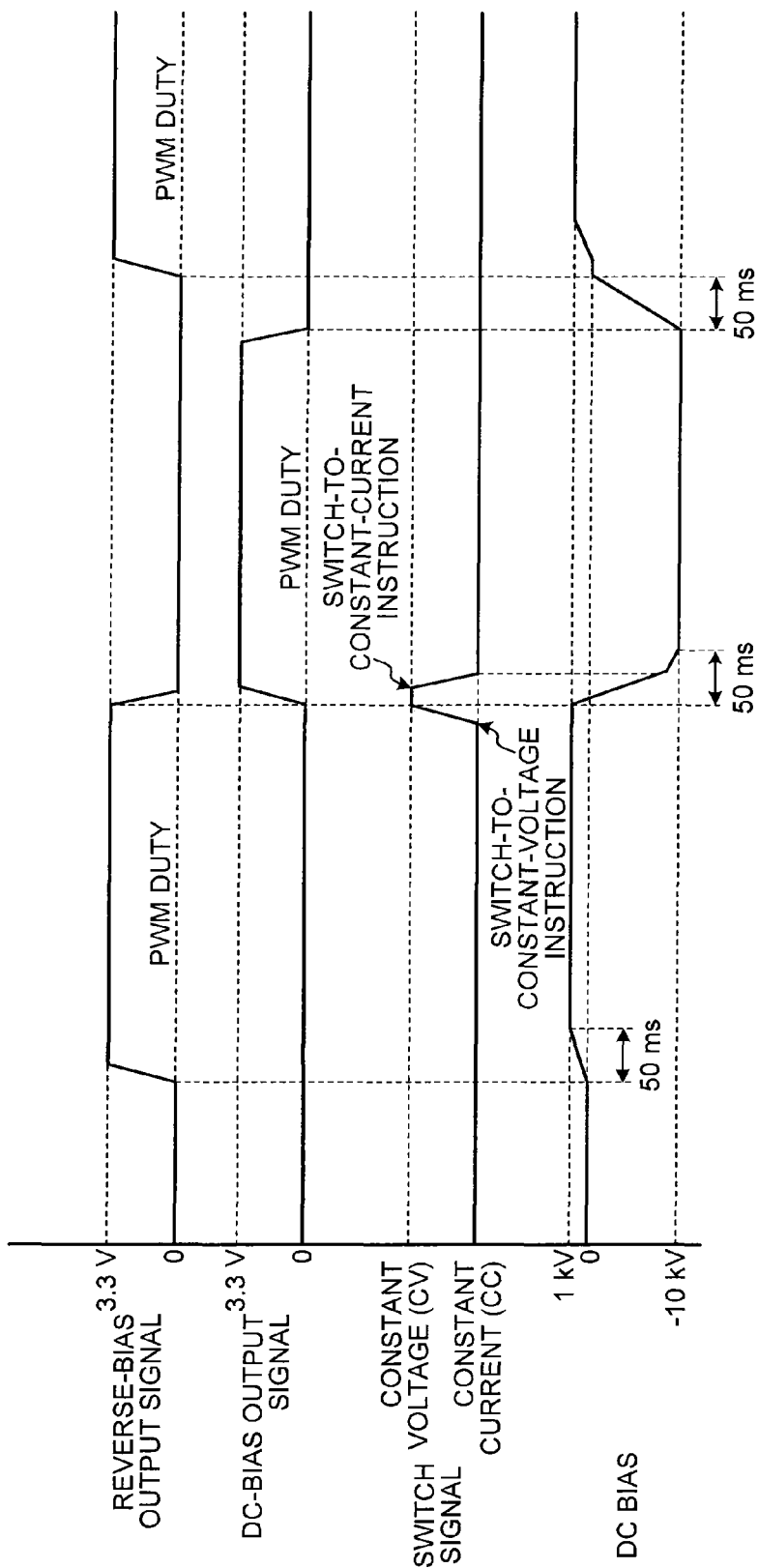
FIG. 7 is a diagram illustrating an example of switching control of the embodiment.

In contrast, in the example illustrated in FIG. 7, when the print-start reference signal that is input is accepted by the CPU 340, the power-supply control unit 342 measures time elapsed theresince and obtains the specifying information to specify the switch-to-constant-voltage timing and the switch-to-constant-current timing.

When the switch-to-constant-voltage timing is met, the power-supply control unit 342 causes the I/O control unit 310 to output a switch signal (switch signal at high state) instructing to switch to the constant voltage (CV) mode to the DC power supply 210. Upon receiving the switch signal instructing to switch to the constant voltage (CV) mode from the I/O control unit 310, the DC power supply 210 switches from the constant current mode to the constant voltage mode.

Subsequently, simultaneously when the DC power supply 210 completes switching from the constant current mode to the constant voltage mode, the power-supply control unit 342 causes the I/O control unit 310 to stop outputting a reverse-bias output signal to the DC power supply 210 and causes the I/O control unit 310 to output the DC-bias output signal to the DC power supply 210. Upon receiving the DC-bias output signal from the I/O control unit 310, the DC power supply 210 starts outputting the DC bias in the constant voltage mode.

Also in this case, charge output as the DC voltage from the DC power supply 210 flows into the AC bypass capacitor 259 until charge is stored in the AC bypass capacitor 259. However, in the constant voltage mode, the amount of charge output as the DC bias can be theoretically infinite. Therefore, charge can be stored in the AC bypass capacitor 259 in a short period of time.

Subsequently, when the switch-to-constant-current timing is met, the power-supply control unit 342 causes the I/O control unit 310 to output a switch signal (switch signal at low state) instructing to switch to the constant current (CC) mode to the DC power supply 210. The switch-to-constant-current timing corresponds to timing at which storing charge in the AC bypass capacitor 259 is to complete, and can be determined from experimental data or the like. Upon receiving the switch signal instructing to switch to the constant current (CC) mode from the I/O control unit 310 (an example of a situation where a predetermined condition is satisfied), the DC power supply 210 switches from the constant voltage mode to the constant current mode, and outputs the DC bias.

In the example illustrated in FIG. 7, because the DC bias is output while switching to the constant voltage mode and to the constant current mode, the value of the DC bias achieves the target value (−10 kV) in 50 ms. Thus, rise time of the DC bias is successfully reduced.

Operations of the printing apparatus according to this embodiment are described below.

Figure 8:
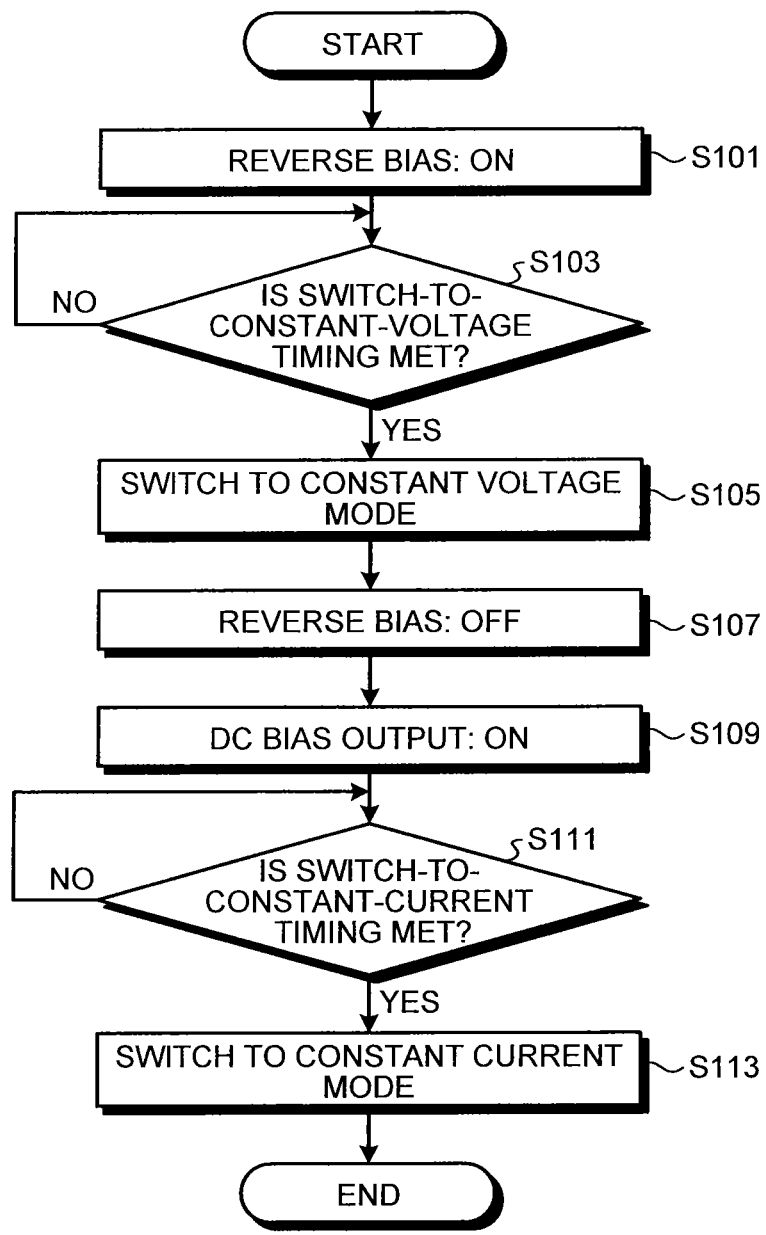
FIG. 8 is a flowchart illustrating an example of control performed by a DC power supply and a power-supply control unit of the embodiment.

FIG. 8 is a flowchart illustrating an example of control performed by the DC power supply 210 and the power-supply control unit 342 of this embodiment.

First, the power-supply control unit 342 causes the I/O control unit 310 to start outputting the reverse-bias output signal to the DC power supply 210 (Step S101).

The power-supply control unit 342 stays on standby until the switch-to-constant-voltage timing according to the specifying information is met (No in Step S103).

Subsequently, when the switch-to-constant-voltage timing is met (Yes in Step S103), the power-supply control unit 342 causes the I/O control unit 310 to output the switch signal instructing to switch to the constant voltage (CV) mode to the DC power supply 210. Upon receiving the switch signal instructing to switch to the constant voltage (CV) mode from the I/O control unit 310, the DC power supply 210 switches from the constant current mode to the constant voltage mode (Step S105).

Subsequently, simultaneously when the DC power supply 210 completes switching from the constant current mode to the constant voltage mode, the power-supply control unit 342 causes the I/O control unit 310 to stop outputting the reverse-bias output signal to the DC power supply 210 (Step S107), and causes the I/O control unit 310 to output the DC-bias output signal to the DC power supply 210 (Step S109). Upon receiving the DC-bias output signal from the I/O control unit 310, the DC power supply 210 starts outputting the DC bias in the constant voltage mode.

Subsequently, the power-supply control unit 342 stays on standby until the switch-to-constant-current timing according to the specifying information is met (No in Step S111).

Subsequently, when the switch-to-constant-current timing is met (Yes in Step S111), the power-supply control unit 342 causes the I/O control unit 310 to output the switch signal instructing to switch to the constant current (CC) mode to the DC power supply 210. Upon receiving the switch signal instructing to switch to the constant current (CC) mode from the I/O control unit 310, the DC power supply 210 switches from the constant voltage mode to the constant current mode, and outputs the DC voltage (Step S113).

As described above, according to this embodiment, outputting the DC voltage is started in the constant voltage mode; then, after switching to the constant current mode, the DC voltage is output in the constant current mode. Accordingly, according to this embodiment, even when a power supply is configured to apply a DC voltage output from a DC power supply to a bypass capacitor until charge is stored in the bypass capacitor, charge can be stored in the bypass capacitor quickly, thereby reducing rise time of the DC voltage. Consequently, this embodiment allows reducing start-up time after power-on and intervals between sheets in printing, thereby achieving power saving and increasing print productivity.

Modifications

The embodiments are not intended to limit the present invention, and can be modified in various ways.

First Modification

In the specific embodiment described above, the timing at which storing charge the AC bypass capacitor 259 is to complete is determined from experimental data or the like in advance, and switching from the constant voltage mode to the constant current mode is performed based on this timing. Alternatively, the embodiment may be modified such that switching from the constant voltage mode to the constant current mode is performed based on a result of detecting an amount of charge stored in the AC bypass capacitor 259.

Figure 9:
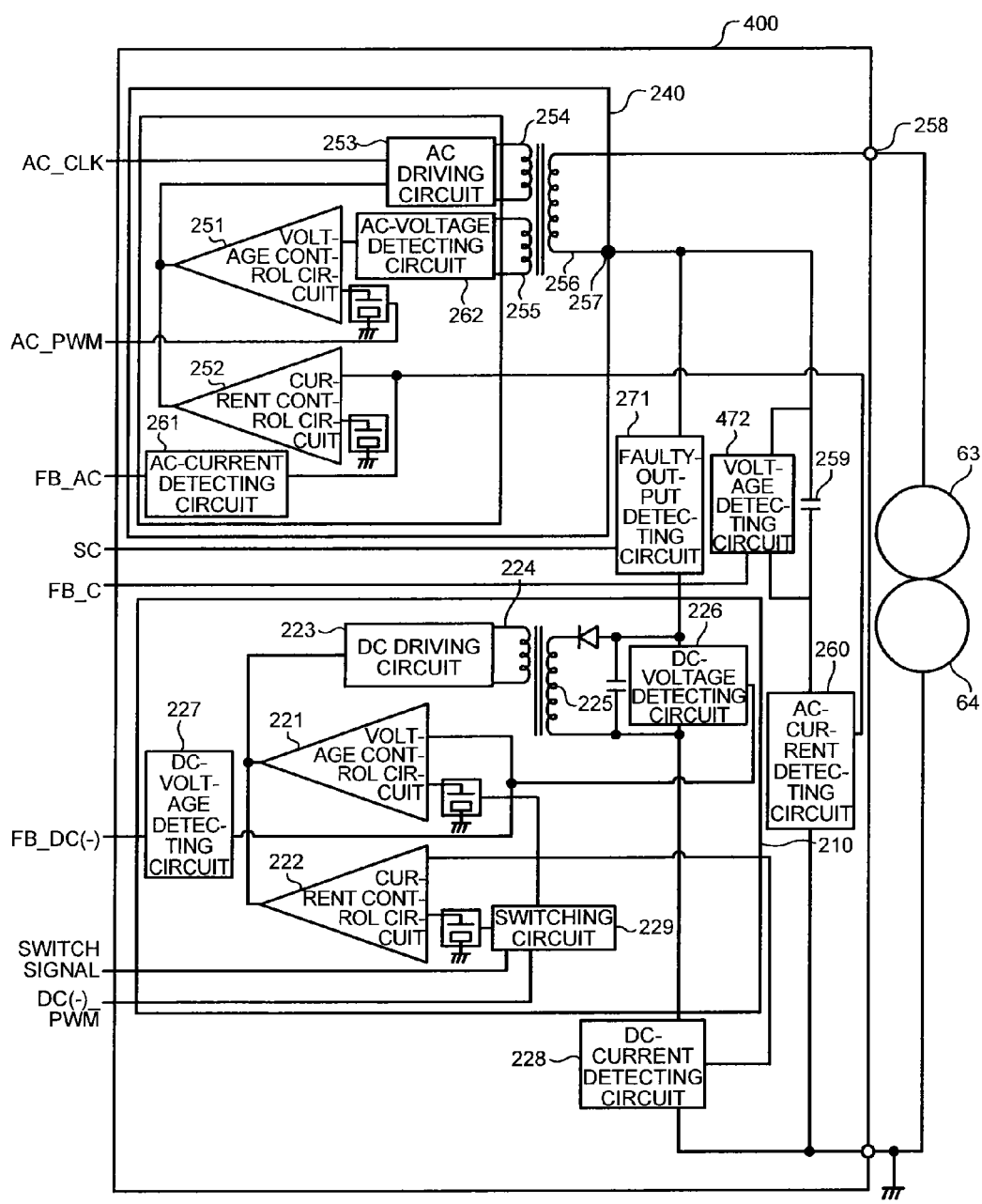
FIG. 9 is a circuit diagram illustrating an example configuration of a secondary-transfer power supply of a first modification.

FIG. 9 is a circuit diagram illustrating an example configuration of a secondary-transfer power supply 400 of a first modification. In the first modification illustrated in FIG. 9, the secondary-transfer power supply 400 includes a voltage detecting circuit 472 that detects a voltage across the AC bypass capacitor 259.

The voltage detecting circuit 472 (an example of a detecting unit) detects the amount of charge stored in the AC bypass capacitor 259 by detecting the voltage across the AC bypass capacitor 259. When detecting that the amount of charge stored in the AC bypass capacitor 259 is equal to or larger than a predetermined amount, the voltage detecting circuit 472 outputs an FB_C signal (feedback signal) to the power-supply control unit 342.

Upon receiving the FB_C signal from the voltage detecting circuit 472, the power-supply control unit 342 causes the I/O control unit 310 to output the switch signal instructing to switch to the constant current (CC) mode to the DC power supply 210. Upon receiving the switch signal instructing to switch to the constant current (CC) mode from the I/O control unit 310, the DC power supply 210 switches from the constant voltage mode to the constant current mode, and outputs the DC bias.

In the first modification, it is not necessary that the switch-to-constant-current timing is specified by the specifying information so long as the switch-to-constant-voltage timing is specified.

Second Modification

The specific embodiment described above may be modified such that the power-supply control unit 342 overwrites the specifying information stored in the ROM 330 based on externally input information. For example, the embodiment may be modified such that when a maintenance person inputs information, with which the specific information is to be overwritten, from the operating unit (not shown), the power-supply control unit 342 overwrites the specific information based on the input information.

The length of time it takes until charge is stored in the AC bypass capacitor 259 is affected by environmental conditions, such as the temperature and the humidity, of a location where the printing apparatus 1 is installed. The second modification allows adapting to varying charge-storing time, which varies depending on the environment of the installed location.

Third Modification

The specific embodiment described above may be configured such that the specifying information is overwritten based on at least any one of the temperature and the humidity of the AC bypass capacitor 259.

Figure 10:
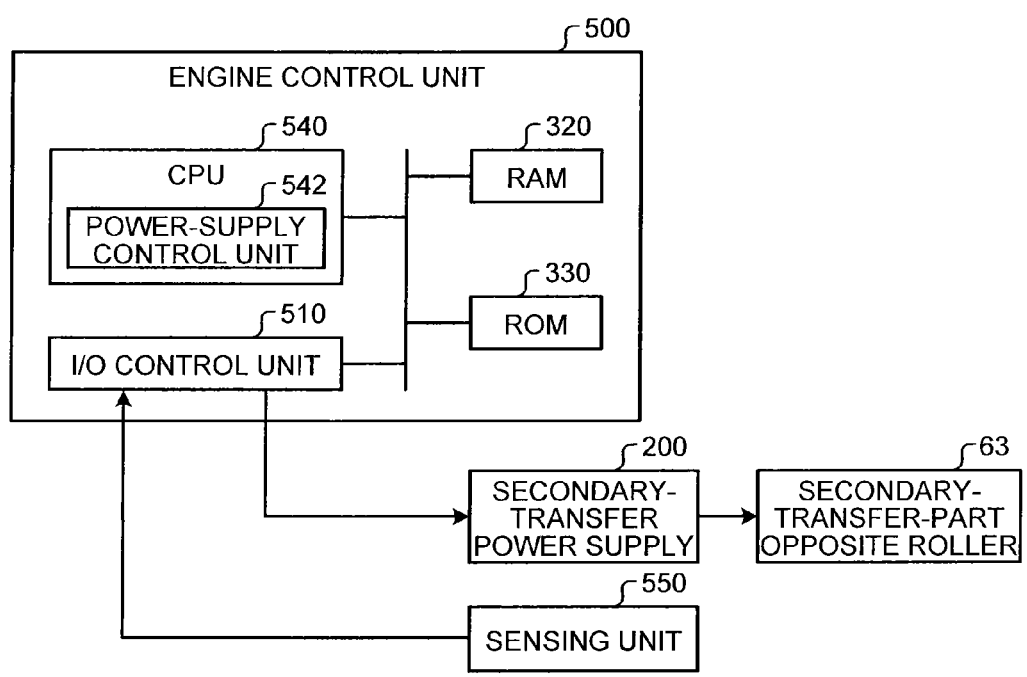
FIG. 10 is a block diagram illustrating an example configuration of an engine control unit of a third modification.

FIG. 10 is a block diagram illustrating an example configuration of an engine control unit 500 of a third modification. In the third modification, the printing apparatus 1 includes a sensing unit 550 that detects at least any one of the temperature and the humidity of the AC bypass capacitor 259. The result detected by the sensing unit 550 is input to a power-supply control unit 542 of a CPU 540 via an I/O control unit 510. The power-supply control unit 542 overwrites the specifying information stored in the ROM 330 based on the result (the at least one of the temperature and the humidity of the AC bypass capacitor 259) detected by the sensing unit 550.

The length of time it takes until charge is stored in the AC bypass capacitor 259 is affected by environmental conditions, such as the temperature and the humidity, of the location where the printing apparatus 1 is installed. The third modification allows automatically adapting to varying charge-storing time, which varies depending on the environment of the installed location.

Fourth Modification

The specific embodiment described above may be modified to use a DC_CCPWM signal for the constant current (CC) mode and a DC_CVPWM signal for the constant voltage (CV) mode.

Figure 11:
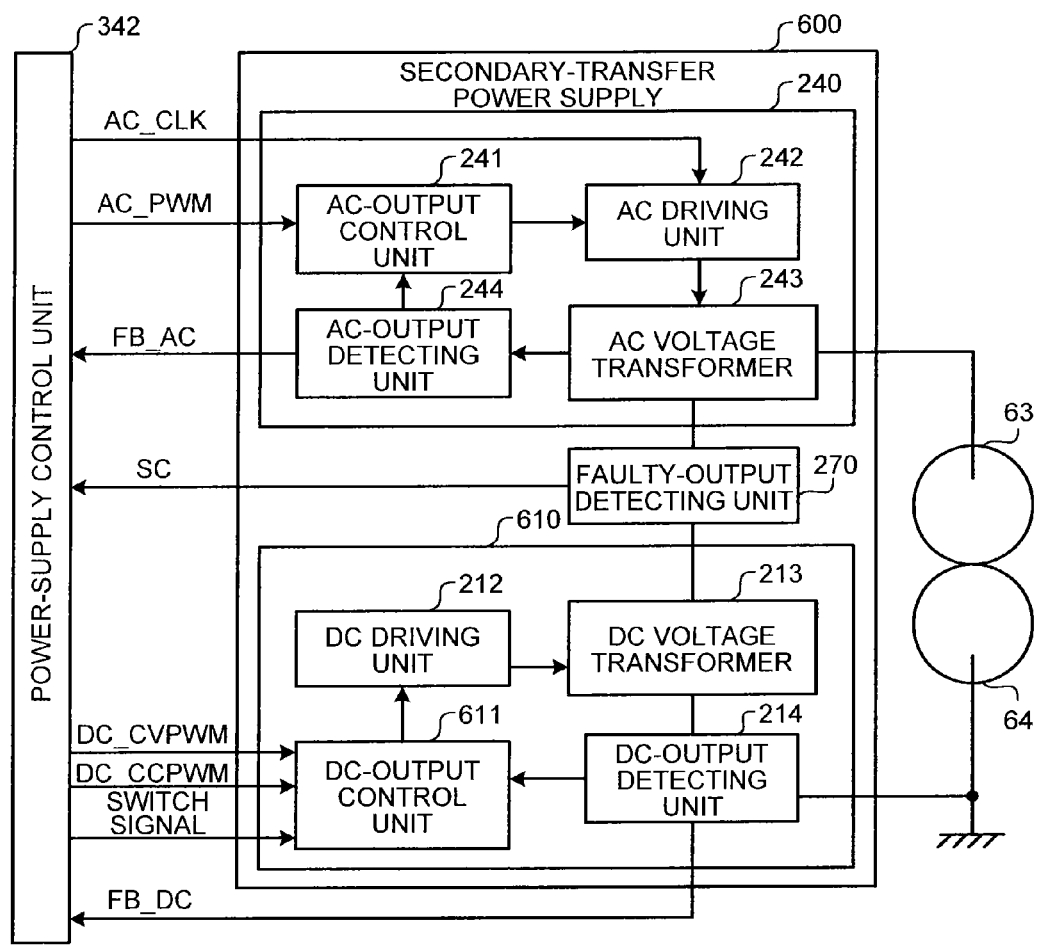
FIG. 11 is a block diagram illustrating an example configuration of a secondary-transfer power supply of a fourth modification.

FIG. 11 is a block diagram illustrating an example configuration of a secondary-transfer power supply 600 of a fourth modification. In the fourth modification illustrated in FIG. 11, the DC_CCPWM signal for the constant current (CC) mode (hereinafter, sometimes referred to as "DCCC-bias output signal") and the DC_CVPWM signal for the constant voltage CV) mode (hereinafter, sometimes referred to as "DCCV-bias output signal") are input to a DC-output control unit 611 of a DC power supply 610 from the power-supply control unit 342. The DC_CCPWM signal, which is an example of a DC control signal for the constant current mode, specifies an output level of the DC voltage. The DC_CVPWM signal, which is an example of a DC control signal for the constant voltage mode, specifies an output level of the DC voltage.

Figure 12:
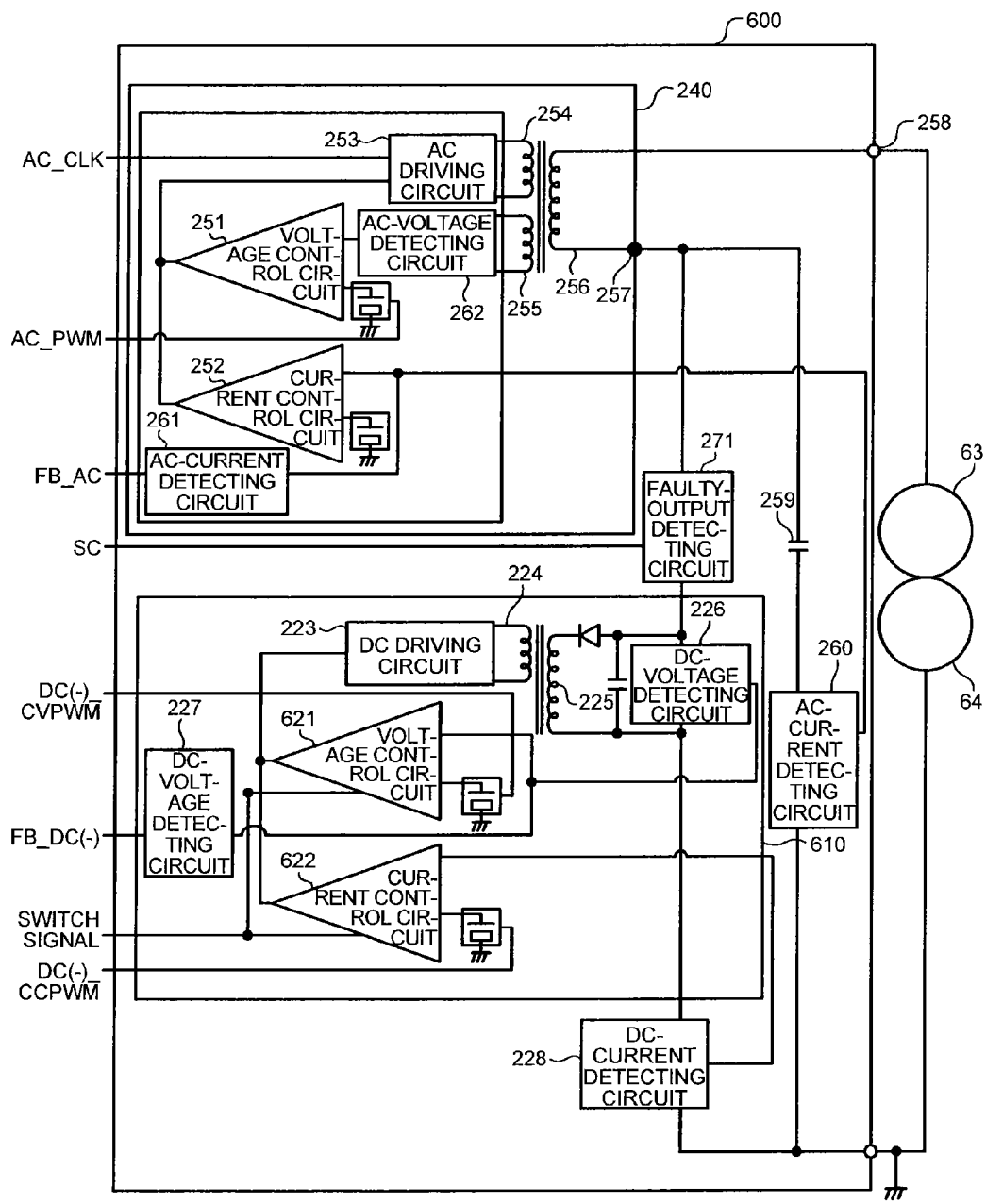
FIG. 12 is a circuit diagram illustrating an example configuration of the secondary-transfer power supply of the fourth modification.

FIG. 12 is a circuit diagram illustrating an example configuration of the secondary-transfer power supply 600 of the fourth modification. In the fourth modification illustrated in FIG. 12, the integral of the DC(-)_CCPWM signal output from the power-supply control unit 342 and a switch signal output from the power-supply control unit 342 are input to a current control circuit 622. The DC(-)_CCPWM signal of the fourth modification is a signal corresponding to the DC(-)_PWM signal of the embodiment described above. The value of the integral of the DC(-)_CCPWM signal is used as a reference voltage in the current control circuit 622. When the switch signal instructs to switch to the constant current (CC) mode (in this embodiment, when the switch signal is at low state), if the DC current is small relative to the reference voltage, the current control circuit 622 causes the DC driving circuit 223 to actively drive the DC high-voltage transformer; if the DC current is large relative to the reference voltage, the current control circuit 622 causes the DC driving circuit 223 to restrict driving of the DC high-voltage transformer.

The integral of the DC(-)_CVPWM signal output from the power-supply control unit 342 and the switch signal output from the power-supply control unit 342 are input to a voltage control circuit 621. The DC(-)_CVPWM signal is constantly at high state in the fourth modification. The value of the integral of the DC(-)_CVPWM signal is used as a reference voltage in the voltage control circuit 621. When the switch signal instructs to switch to the constant voltage (CV) mode (in this embodiment, when the switch signal at high state) and the DC(-)_CVPWM signal is at high state, if the output value of the DC voltage is small relative to the reference voltage, the voltage control circuit 621 causes the DC driving circuit 223 to actively drive the DC high-voltage transformer; if the output value of the DC voltage is equal to or larger than the reference voltage (upper limit), the voltage control circuit 621 causes the DC driving circuit 223 to restrict driving of the DC high-voltage transformer. In short, in the fourth modification, the voltage control circuit 621 operates in the constant voltage mode if a logical AND of the switch signal and the DC(-)_CVPWM signal is at high state (i.e., 1).

Figure 13:
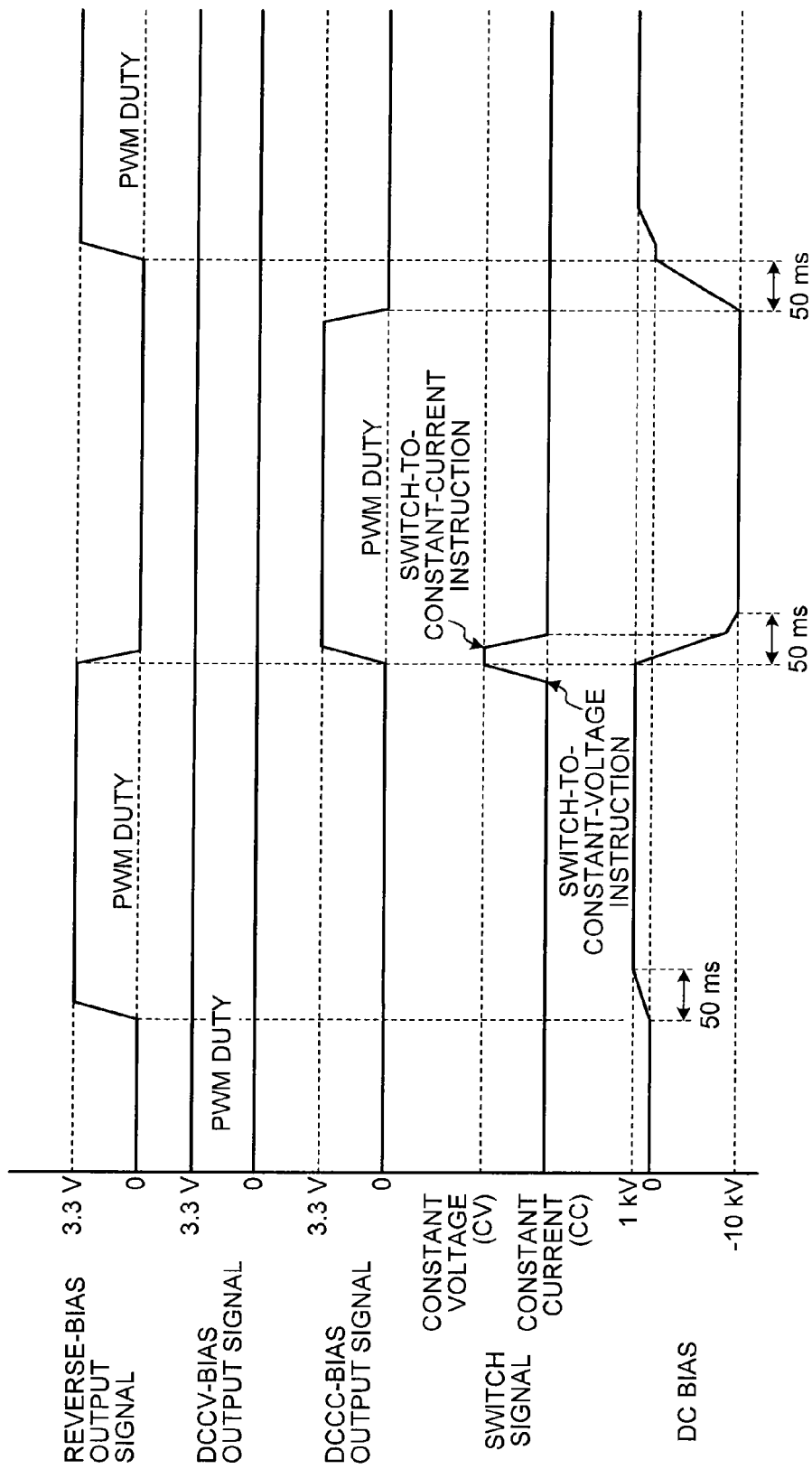
FIG. 13 is a diagram illustrating an example of switching control of the fourth modification.

FIG. 13 is a diagram illustrating, as an example of switching control of the fourth modification, an example of rise timing of a DC bias output from the DC power supply 610 that switches to the constant voltage mode and then to the constant current mode.

In the fourth modification illustrated in FIG. 13, the I/O control unit 310 of the power-supply control unit 342 constantly outputs the DCCV-bias output signal to the DC power supply 610.

When the switch-to-constant-voltage timing is met, the power-supply control unit 342 causes the I/O control unit 310 to output the switch signal (switch signal at high state) instructing to switch to the constant voltage (CV) mode to the DC power supply 610. When the switch signal instructing to switch to the constant voltage (CV) mode is fed to the DC power supply 610 from the I/O control unit 310 and the DCCV-bias output signal is at high state, the DC power supply 610 switches from the constant current mode to the constant voltage mode, and starts outputting a DC bias according to the DCCV-bias output signal.

Subsequently, simultaneously when the DC power supply 610 completes switching from the constant current mode to the constant voltage mode, the power-supply control unit 342 causes the I/O control unit 310 to stop outputting the reverse-bias output signal to the DC power supply 610 and causes the I/O control unit 310 to output the DCCC-bias output signal to the DC power supply 610.

Subsequently, when the switch-to-constant-current timing is met, the power-supply control unit 342 causes the I/O control unit 310 to output the switch signal (switch signal at low state) instructing to switch to the constant current (CC) mode to the DC power supply 610. Upon receiving the switch signal instructing to switch to the constant current (CC) mode from the I/O control unit 310, the DC power supply 610 switches from the constant voltage mode to the constant current mode, and outputs the DC bias according to the DCCC-bias output signal.

As described above, according to the fourth modification, even when timing of the switch signal fluctuates with respect to the DCCC-bias output signal (for example, when timing of the switch signal is early relative to the DCCC-bias output signal), it is ensured that operations are performed in the constant voltage (CV) mode during when the switch signal is instructing to switch to the constant voltage (CV) mode. As a result, influence of the fluctuation in the switch signal can be reduced.

The fourth modification has been described by way of example in which the DC(-)_CVPWM signal at high state specifies the output level (3.3 V) of the constant voltage as determined by the circuit configuration of the secondary-transfer power supply 200. Alternatively, there may be employed a design in which the output level of the constant voltage is specified by the DC(-)_CVPWM signal at low state as determined by a circuit configuration of the secondary-transfer power supply 200. In other words, the output level of the constant voltage may be specified by either the DC(-)_CVPWM signal at high state or the DC(-)_CVPWM signal at low state.

Fifth Modification

In the specific embodiment described above, the transfer bias is applied from the secondary-transfer power supply 200, which is for the transfer bias, connected to the secondary-transfer-part opposite roller 63. A toner image can be as well successfully transferred to a recording sheet even when the embodiment is modified such that the transfer bias is applied from the secondary-transfer power supply 200, which is for the transfer bias, connected to the secondary transfer roller 64. A toner image can be also as well successfully transferred to a recording sheet even when, for example, the embodiment is modified such that the printing apparatus 1 includes a plurality of the secondary-transfer power supplies 200 which are for the transfer bias, and one of the secondary-transfer power supplies 200 is connected to the secondary-transfer-part opposite roller 63 and the other is connected to the secondary transfer roller 64.

Sixth Modification

In the embodiment described above, timing as to when to output the high voltage is specified by software; alternatively, the timing may be specified by hardware.

Seventh Modification

The embodiment may be modified such that the secondary-transfer power supply 200 includes a DC power supply for cleaning.

The embodiments and the modifications described above are for illustration purposes only. The inventors have found through experimentation using other image forming apparatuses and in various image forming environments that the present invention can be implemented even with various modifications made to the configurations and processing conditions.

According to an aspect of the present invention, voltage rise time can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
a direct-current (DC) power supply that outputs a DC voltage;
an alternating-current (AC) power supply that outputs any one of the DC voltage and a superimposed voltage being the DC voltage with an AC voltage superimposed thereon; and
a bypass capacitor that charges a part of a voltage that is output from the AC power supply, wherein
the DC power supply starts outputting the DC voltage in a constant voltage mode and, when a predetermined condition that is associated with the bypass capacitor is satisfied, switches from the constant voltage mode to a constant current mode to output the DC voltage in the constant current mode.

2. The power supply device according to claim 1, wherein the predetermined condition corresponds to a predetermined timing associated with storing charge in the bypass capacitor.

3. The power supply device according to claim 2, wherein the predetermined timing is timing specified with reference to a print-start reference signal.

4. The power supply device according to claim 1, further comprising
a detecting circuit that detects an amount of charge stored in the bypass capacitor, wherein
the predetermined condition is satisfied when the amount of charge stored in the bypass capacitor becomes equal to or larger than a predetermined amount.

5. A power supply device comprising:
a direct-current (DC) power supply that outputs a DC voltage;
an alternating-current (AC) power supply that outputs any one of the DC voltage and a superimposed voltage being the DC voltage with an AC voltage superimposed thereon;
a bypass capacitor that charges a part of a voltage that is output from the AC power supply, wherein
the DC power supply starts outputting the DC voltage in a constant voltage mode and when a predetermined condition is satisfied, switches from the constant voltage mode to a constant current mode to output the DC voltage in the constant current mode,
a DC_CV control signal specifying a level of the DC voltage to be output in the constant voltage mode, a DC_CC control signal specifying a level of the DC voltage to be output in the constant current mode, and a switch signal that instructs to switch between the constant voltage mode and the constant current mode are fed to the DC power supply,
when both a condition that the switch signal instructs to switch to the constant voltage mode and a condition that the level specified by the DC_CV control signal is a level, at which a constant voltage is to be output, are satisfied, the DC power supply switches to the constant voltage mode and outputs the DC voltage according to the DC_CV control signal, and
when the switch signal instructs to switch to the constant current mode, the DC power supply switches to the constant current mode and outputs the DC voltage according to the DC_CC control signal.

6. An image forming apparatus comprising:
a power supply device that includes
a direct-current (DC) power supply that outputs a DC voltage,
an alternating-current (AC) power supply that outputs any one of a superimposed voltage and the DC voltage, the superimposed voltage being the DC voltage with an AC voltage superimposed thereon, and
a bypass capacitor that charges a part of a voltage that is output from the AC power supply, wherein
the DC power supply starts outputting the DC voltage in a constant voltage mode and, when a predetermined condition that is associated with the bypass capacitor is satisfied, switches from the constant voltage mode to a constant current mode to output the DC voltage in the constant current mode.

7. The image forming apparatus according to claim 6, wherein the predetermined condition corresponds to a predetermined timing, and the image forming apparatus further comprises:
a storage that stores specifying information that specifies the predetermined timing; and
circuitry that, when the predetermined timing specified by the specifying information is met, causes the DC power supply to switch from the constant voltage mode to the constant current mode, wherein
the circuitry overwrites the specifying information stored in the storage based on externally input information.

8. The image forming apparatus according to claim 6, wherein the predetermined condition corresponds to a predetermined timing, and the image forming apparatus further comprises:
a storage that stores specifying information that specifies the predetermined timing;
circuitry that, when the predetermined timing specified by the specifying information is met, causes the DC power supply to switch from the constant voltage mode to a constant current mode; and a sensor that detects at least one of the temperature and the humidity of the bypass capacitor, wherein the circuitry overwrites the specifying information stored in the storage based on the at least one of the temperature and the humidity of the bypass capacitor detected by the sensor.

9. A voltage output method comprising:

outputting a direct current (DC) voltage in a constant voltage mode, and when a predetermined condition that is associated with the bypass capacitor is satisfied, switching from the constant voltage mode to a constant current mode to output the DC voltage in the constant current mode; and outputting any one of the DC voltage and a superimposed voltage being the DC voltage with an alternative-current voltage superimposed thereon.

* * * * *